(12) United States Patent
Herrin et al.

(10) Patent No.: US 11,170,108 B2
(45) Date of Patent: Nov. 9, 2021

(54) BLOCKCHAIN TECHNIQUE FOR IMMUTABLE SOURCE CONTROL

(71) Applicant: INTERNATIONAL BUSINESS MACHINES CORPORATION, Armonk, NY (US)

(72) Inventors: Bradley C. Herrin, Austin, TX (US); Xianjun Zhu, Cary, NC (US); Bo Zhang, Cary, NC (US); Alexander Sobran, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 16/194,556

(22) Filed: Nov. 19, 2018

(65) Prior Publication Data

US 2020/0159928 A1 May 21, 2020

(51) Int. Cl.
*G06F 21/57* (2013.01)
*G06Q 20/38* (2012.01)
*G06F 16/18* (2019.01)
*H04L 29/08* (2006.01)

(52) U.S. Cl.
CPC .......... *G06F 21/57* (2013.01); *G06F 16/1805* (2019.01); *G06Q 20/382* (2013.01); *H04L 67/104* (2013.01); *H04L 67/28* (2013.01); *H04L 2209/38* (2013.01)

(58) Field of Classification Search
CPC ...... G06F 21/57; G06F 21/64; G06F 16/1805; G06Q 20/382; G06Q 20/0655; H04L 67/104; H04L 67/28; H04L 2209/38
See application file for complete search history.

(56) References Cited

U.S. PATENT DOCUMENTS

| | | | |
|---|---|---|---|
| 8,245,192 B1* | 8/2012 | Chen | G06F 8/71 717/122 |
| 10,270,600 B2* | 4/2019 | Vandervort | H04L 9/3247 |
| 2013/0110798 A1* | 5/2013 | Millett | G06F 16/21 707/705 |
| 2016/0212100 A1* | 7/2016 | Banerjee | H04L 63/08 |
| 2018/0176229 A1 | 6/2018 | Bathen et al. | |
| 2018/0181979 A1* | 6/2018 | Frank | G06Q 30/0217 |
| 2018/0189732 A1* | 7/2018 | Kozloski | G06F 8/71 |
| 2018/0260212 A1* | 9/2018 | Wisnovsky | G06F 8/71 |
| 2019/0171739 A1* | 6/2019 | Cochrane | G06F 16/2379 |
| 2019/0354614 A1* | 11/2019 | Chui | H04L 9/3247 |
| 2019/0392164 A1* | 12/2019 | Dutta | G06F 21/602 |
| 2020/0019706 A1* | 1/2020 | Zhu | G06F 8/71 |

(Continued)

OTHER PUBLICATIONS

Andrey Novikov, "git push—force and how to deal with it", Sep. 12, 2017, 6 pages (Year: 2017).*

(Continued)

*Primary Examiner* — Carl G Colin
*Assistant Examiner* — Han Yang
(74) *Attorney, Agent, or Firm* — Teddi E. Maranzano (57) ABSTRACT

An example operation may include one or more of seeking consensus among users of a source tree to approve execution of a blocked command to a source control system, creating a child ledger for a user issuing the blocked command and initiating a blockchain transaction to link the child ledger to a master ledger, merging the child ledger into the master ledger when consensus is reached, and executing the blocked command.

20 Claims, 6 Drawing Sheets

(56) References Cited

U.S. PATENT DOCUMENTS

| | | | |
|---|---|---|---|
| 2020/0019707 A1* | 1/2020 | Zhu | G06F 21/57 |
| 2020/0128088 A1* | 4/2020 | Badyan | H04L 63/145 |
| 2020/0133658 A1* | 4/2020 | Agrawal | G06F 8/70 |
| 2020/0159927 A1* | 5/2020 | Herrin | H04L 9/0643 |
| 2020/0210170 A1* | 7/2020 | Johnson | H04L 9/3239 |

OTHER PUBLICATIONS

N. Nizamuddin, "Decentralized document version control using ethereum blockchain and IPFS", Apr. 1, 2019, Computers and Electrical Engineering, 15 pages (Year: 2019).*
Dinh et al., "UStore: A Distributed Storage With Rich Semantics", arXiv:1702.02799v1 [cs.DB] Feb. 9, 2017, pp. 1-21.
Nikitin et al., "CHAINIAC: Proactive Software-Update Transparency via Collectively Signed Skipchains and Verified Builds", Usenix, The Advanced Computing Systems Association, Proceedings of the 26th USENIX Security Symposium, Aug. 16-18, 2017, pp. 1-19.
Ulybyshev et al., "'Blockhub': Blockchain-based Software Development System for Untrusted Environments", 2018 IEEE 11th International Conference on Cloud Computing, pp. 582-585.
Pending U.S. Appl. No. 16/031,550, filed Jul. 10, 2018, entitled: "Blockchain Technique for Agile Software Development Framework".
IBM: List of IBM Patents or Patent Applications Treated as Related (Appendix P), Date, 2 pages.

* cited by examiner

BLOCKCHAIN TECHNIQUE FOR IMMUTABLE SOURCE CONTROL

TECHNICAL FIELD

The present invention relates generally to the field of computing, and more particularly, to blockchain.

BACKGROUND

Source control systems store the histories of changes to the source control repository along with the source code. These histories are normally immutable through developer commands. However, source control systems support certain privileged commands that can rewrite these histories, causing catastrophic loss to the source code in the source control repository if used carelessly.

Storing the immutable events and the state of the repository in a blockchain may prevent loss in the source control repository by requiring a consensus of participants on the blockchain to agree to a change to the source control repository before the change is committed.

SUMMARY

One example embodiment may provide a method that includes one or more of intercepting, by a proxy, a command from a user to modify a source tree in a source control system, creating a child ledger linked to a master ledger when the intercepted command is destructive, seeking consensus among users of the source tree to approve execution of the intercepted command, merging the child ledger into the master ledger with a transaction describing the intercepted command, a commit tree history, and status of the consensus, and a tree hash, and merging execution results of the intercepted command into the commit tree history.

Another example embodiment may provide a system that includes a server configured to intercept, by a proxy, a command from a user to modify a source tree in a source control system. The server is further configured to create a child ledger linked to a master ledger when the intercepted command is destructive. The server is further configured to seek consensus among users of the source tree to approve execution of the intercepted command, merge the child ledger into the master ledger with a transaction describing the intercepted command, a commit tree history, and status of the consensus, and a tree hash, and merge execution results of the intercepted command into the commit tree history.

A further example embodiment may provide a non-transitory computer readable medium comprising instructions, that when read by processor, cause the processor to perform one or more of intercept, by a proxy, a command from a user to modify a source tree in a source control system, create a child ledger lined to a master ledger when the intercepted command is destructive, seek consensus among users of the source tree to approve execution of the intercepted command. The processor is further configured to merge the child ledger into the master ledger with a transaction describing the intercepted command, a commit tree history, and status of the consensus, and a tree hash, and merge execution results of the intercepted command into the commit tree history.

Another example embodiment may provide a method that includes one or more of seeking consensus among users of a source tree to approve execution of a blocked command to a source control system, creating a child ledger for a user issuing the blocked command and initiating a blockchain transaction to link the child ledger to a master ledger, merging the child ledger into the master ledger when consensus is reached, and executing the blocked command.

Another example embodiment may provide a system that includes a server configured to seek consensus among users of a source tree to approve execution of a blocked command to a source control system, create a child ledger for a user issuing the blocked command and initiate a blockchain transaction to link the child ledger to a master ledger, merge the child ledger into the master ledger when consensus is reached, and execute the blocked command.

A further example embodiment may provide a non-transitory computer readable medium comprising instructions, that when read by processor, cause the processor to perform one or more of seek consensus among users of a source tree to approve execution of a blocked command to a source control system, create a child ledger for a user issuing the blocked command and initiate a blockchain transaction to link the child ledger to a master ledger, merge the child ledger into the master ledger when consensus is reached, and execute the blocked command.

DETAILED DESCRIPTION

It will be readily understood that the instant components, as generally described and illustrated in the figures herein, may be arranged and designed in a wide variety of different configurations. Thus, the following detailed description of the embodiments of one or more method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in one or more embodiments. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide immutable source control using blockchain.

Many source control systems store the histories of changes in a source control repository as a graph of differences between code versions. The commands that software developers typically use in developing source code do not result in mutable changes to the change histories. However, source control systems can also provide more specialized commands and command options that do support mutable changes to the change histories. Use of these commands and command options can result in catastrophic loss of data because they unconditionally overwrite the source control repository with the local work of the developer who issued the command.

For example, in Git (an open source version control management system), an employee can issue a command to force a rewritten change history, either deliberately or accidentally. The result is the removal of source code files and other files required to build applications that provide critical business functionality. Typically, recovery from such a loss event includes restoring a backup archive of the source control repository. Work entered in the source control repository between the date of the backup archive and the date of the loss event may be unrecoverable. Another popular option is to maintain protected branches using the settings menu of the source control system; although someone having the permissions to do so can change these settings, thereby making the branches unprotected.

However, there are constructive uses of commands to force rewriting a change history. For example, an authorized administrator can rewrite the Git change history to remove malicious changes to the source control repository, even after the changes have been running in production. An administrator of the source control repository can make these mutable changes to the change history without consensus from either the developers or other administrators.

Embodiments of the present invention store mutable events and the state of the source control repository at the time of immutable events on a blockchain. The immutability of the blockchain allows access to the full mutable change history and provides traceability of the events in the mutable change histories. This resolves the issues of recoverability and traceability. Further, a consensus system allows developers to make mutable changes to the change history.

As will be discussed in more detail with reference to the Figures, the blockchain master ledger is an append-only ledger. The embodiments of the present invention can be implemented in any source control system having commands that are destructive to the commit history tree. Here, the embodiments of the present invention are described in terms of Git, the open source control system. When a developer issues a command that would force a change to the source control repository, the command is distributed to the other developers who are sharing access to the same source control repository. The command has a timestamp and is immutable. A proxy layer, implemented between the developer and the Git server, filters all Git commands from the users. If the proxy recognizes the command as a force type of command (i.e., on that alters the commit history tree), the proxy blocks the command from being sent to the Git server, but instead captures the command in a blockchain ledger. Once the users on the source control system approve the command and the resulting change in the blockchain, the command is executed on the source control system, and the change is merged to the Git server. Regardless of whether consensus reaches an approval or rejection state the proxy captures the tree hash and references into the ledger as an extra safeguard against potential destructive activity affecting the source control repository.

A blockchain is a distributed system that includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node that can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database that maintains a current state of the blockchain. There is typically one ledger per channel. Each peer node maintains a copy of the ledger for each channel of which they are a member.

A chain is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some embodiments employ an Agile software development framework to a blockchain for co-authoring software based on the requirements for separate entities that trust each other while requiring transparency and consensus in large scale multi-corporation environments in order to write code together to solve sensitive data problems and ensuring security throughout the software development lifecycle. These embodiments may include a smart contract embodied on a proxy that monitors commands destined for the source control system. The proxy intercepts commands that may result in destructive changes to the source control repository. These commands are considered blocked commands. Commands that merely append to the commit history tree are considered normal, i.e., non-blocked commands. The proxy creates a transaction on the blockchain, and seeks consensus whether the commands should be executed. These embodiments may include advantages such as providing a transparent, immutable source code record system based on fundamental source control system principles and blockchain technology to enable the collaborative real time development of software assets.

Some of these embodiments ensure all participants are acting upon the same software while also trusting the data and sources of all software introduced into the development workspace. Master ledger may become the trusted history of the project and may be used as an immutable store of mutable commands, along with events and state of the source control repository at the time of the mutable command. The proxy, through the smart contract, provides a historical trace of downloads, and has signature when a child ledger commit goes up for vote in the smart contract. This allows everyone to have equal viewership and ownership of the solution and provides a check, through the consensus, on potentially destructive events.

The instant application in one embodiment relates to blockchain technology, and in another embodiment relates to applying blockchain technique for immutable source control.

Figure 1:
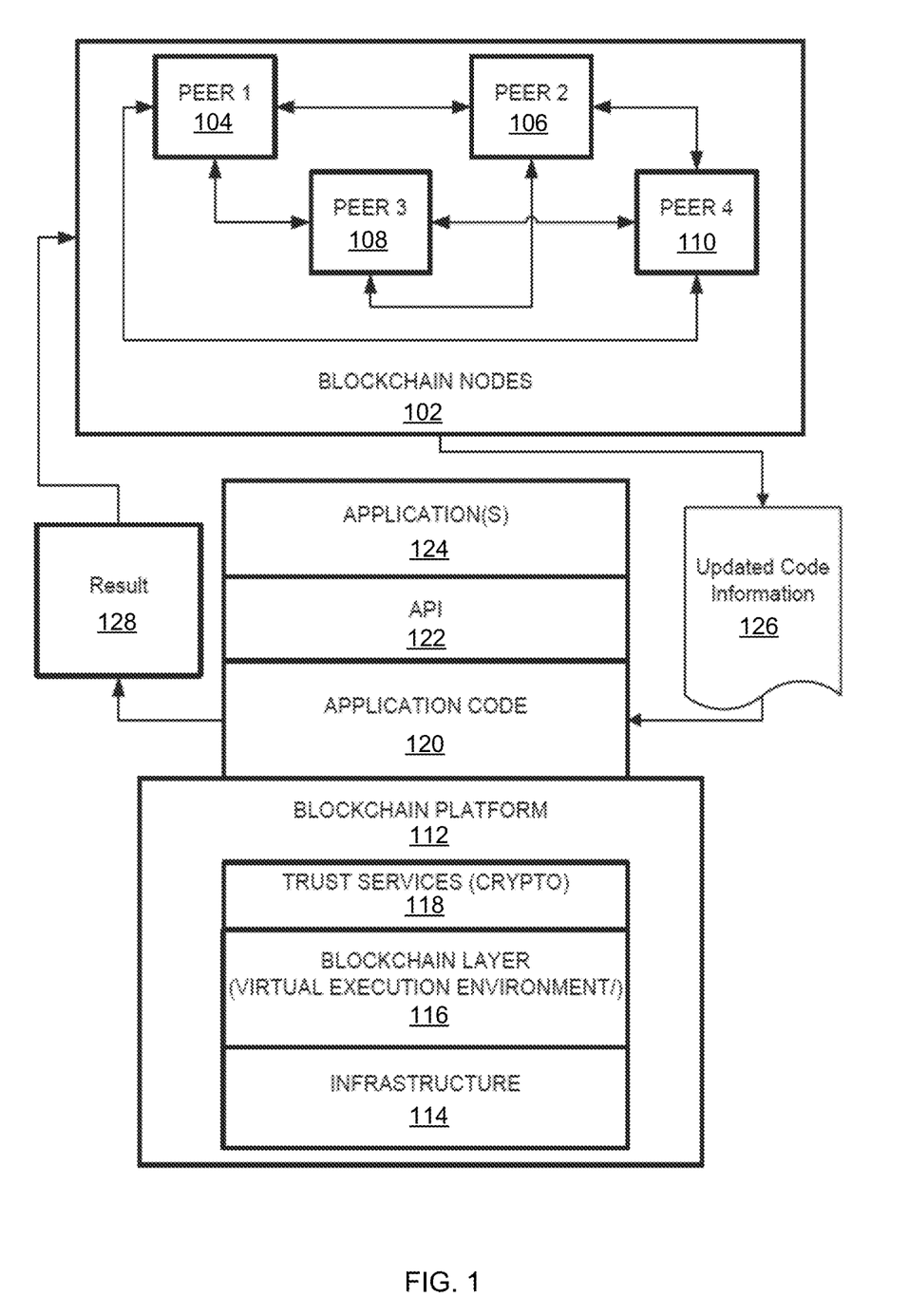
FIG. 1 illustrates an example peer node blockchain architecture configuration for an asset sharing scenario, according to example embodiments.

FIG. 1 illustrates a blockchain architecture configuration, according to example embodiments. Referring to FIG. 1, the blockchain architecture may include certain blockchain elements, for example, a group of blockchain nodes 102. The blockchain nodes 102 may include one or more nodes 104-110. It should be noted that four nodes are depicted by way of example only. These nodes participate in a number of activities, such as blockchain transaction addition and validation process (consensus). One or more of the blockchain nodes 104-110 may endorse transactions and may provide an ordering service for all blockchain nodes in the architecture. A blockchain node may initiate a blockchain authentication and seek to write to a blockchain immutable ledger stored in blockchain layer 116, a copy of which may also be stored on the underpinning physical infrastructure 114. The blockchain configuration may include one or applications 124 which are linked to application programming interfaces (APIs) 122 to access and execute stored program/application code 120 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 104-110.

The blockchain base or platform 112 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 116 may expose an interface that provides access to the virtual execution environment necessary to process the program code and engage the physical infrastructure 114. Cryptographic trust services 118 may be used to verify transactions such as asset exchange transactions and keep information private.

The blockchain architecture configuration of FIG. 1 may process and execute program/application code 120 via one or more interfaces exposed, and services provided, by blockchain platform 112. The code 120 may control blockchain assets. For example, the code 120 can store and transfer data, and may be executed by nodes 104-110 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, updated code information 126 may be processed by one or more processing entities (e.g., virtual machines) included in the blockchain layer 116. The result 128 may include information related to the updated master ledger. The physical infrastructure 114 may be utilized to retrieve any of the data or information described herein.

Within chaincode, a smart contract may be created via a high-level application and programming language, and then written to a block in the blockchain. The smart contract may include executable code that is registered, stored, and/or replicated with a blockchain (e.g., distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 1, development may commit updates to the development ledger, triggering a review by way of smart contract at 126. One function may be to validate code, and commit updates to master ledger at 128, which may be provided to one or more of the nodes 104-110.

Figure 2:
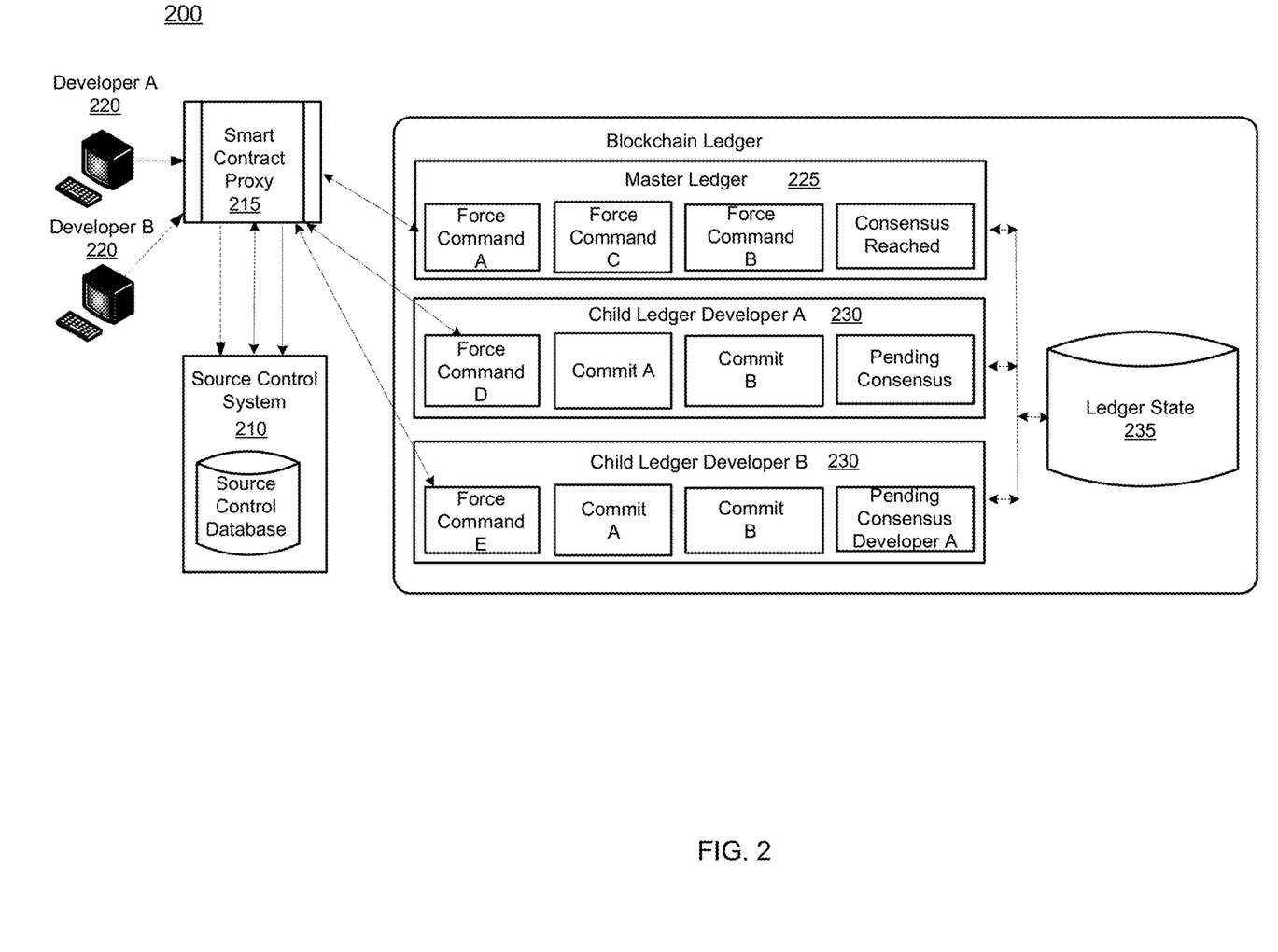
FIG. 2 illustrates an example blockchain configuration with a proxy, according to example embodiments.

FIG. 2 illustrates an example blockchain configuration with a proxy, according to example embodiments. Referring to FIG. 2, the blockchain configuration includes a source control system 210. A plurality of users, two of which are shown as Developer A 220 and Developer B 220 are connected to the source control system 210. A smart contract embodied as a smart contract proxy 215 is interposed between the plurality of users and the source control system 210. The smart contract proxy 215 monitors commands from the users, and based on configured definitions, determines whether the commands may be passed to the source control system 210 for execution. The smart contract proxy 215 initiates a blockchain transaction that places the commands that are identified as potentially destructive to the integrity of the source control system 210 on the master ledger 225. These commands are referred to as blocked commands. The transaction includes a request for consensus from each participating user that is placed in the corresponding user's child ledger 230. The proxy smart contract 215 may pass the command to the source control system 210 if consensus is reached to for such action. The blockchain transaction is traceable through entries in the ledger state 235.

Figure 3:
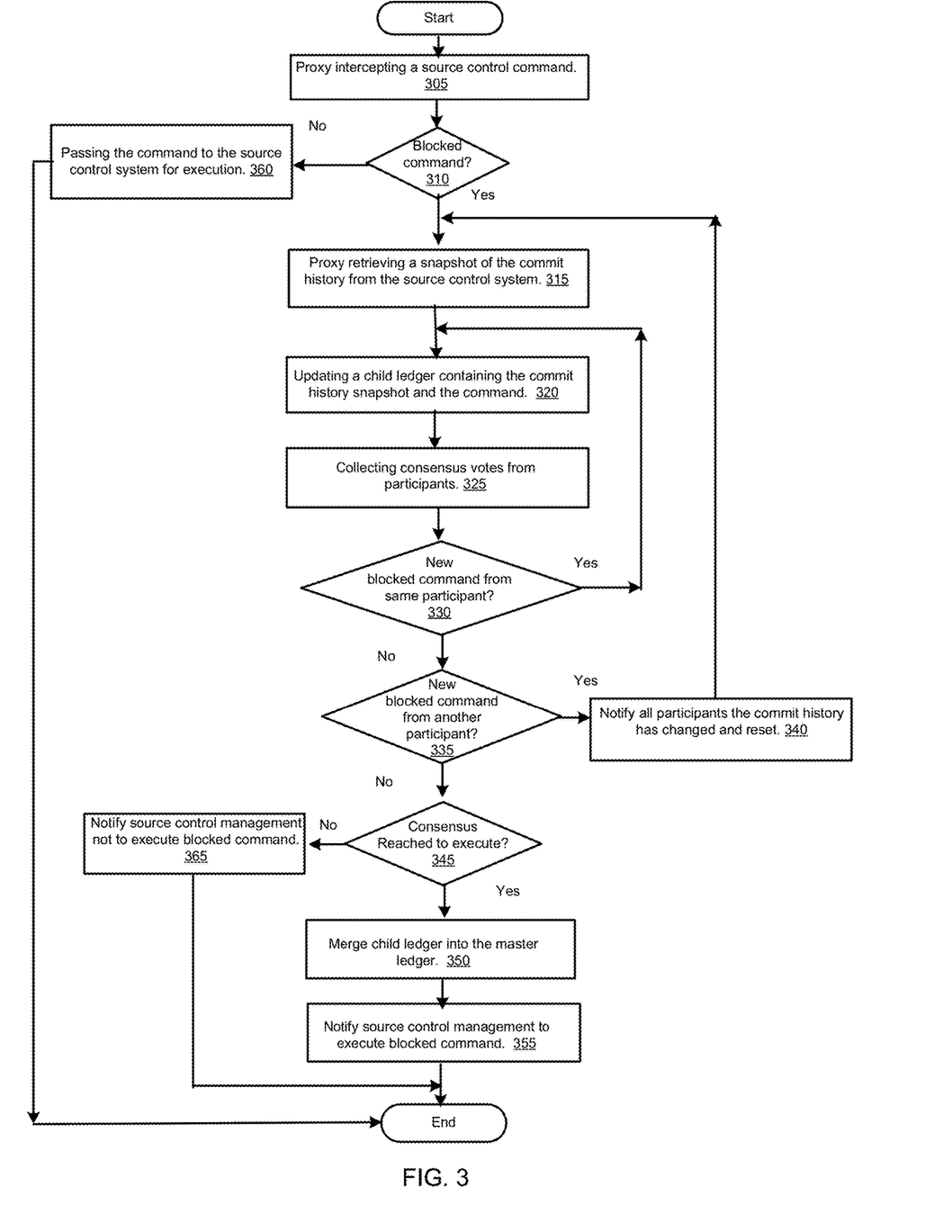
FIG. 3 is a flow diagram of an example of applying blockchain for immutable source control.

FIG. 3 illustrates and example flow diagram of an example of applying blockchain for immutable source control.

Starting at 305, a user interacts with a software control system by, for example, issuing commands to retrieve or save source code files. A smart contract proxy 215 that is on a network between the user's device and the source control system 210 monitors commands that the user issues to the source control system 210.

At 310, if the smart contract proxy 215 does not identify an intercepted command as a potentially destructive command that should be blocked, then the command is passed to the source control system for execution (360). The smart contract proxy 215 can be customized for various source control systems from different vendors. Therefore, potentially destructive commands are identified and configured in the smart contract proxy 215 based on which commands an administrator chooses to block in a particular source control system. Since the customization occurs in the smart contract proxy 215, it is transparent to the user and modification of the source control system 210 is not needed.

If at 310, the smart contract proxy 215 identifies the intercepted command as a blocked command, then the smart contract proxy 215 does not directly pass the command to the source control system 210. A potentially destructive command is one that can result in catastrophic loss of data because the command unconditionally overwrites the source control repository with the local work of the developer who issued the command. An example of such a command is "push" with the "force" option in the open source control system, Git.

The smart contract proxy 215 retrieves a snapshot of the commit history from the source control system, at 315. The smart contract proxy 215 creates a temporary child ledger. The child ledger includes a copy of the master ledger plus the suggested changes to the source tree, the snapshot of the commit history, and the proposed command (320).

The smart contract proxy 215 then creates and sends a request for consent for consensus to interested participants, for example, the users whose work may be affected if the command were to be executed (325). The consensus process may be implemented as any consensus type algorithm, such as lottery-based and voting based. The number of users required to reply to the request for consent for consensus is a pre-configured rule in the smart contract. For example, either all, or only a subset of the users, are required to approve the execution of the command.

When a consensus process is pending, and the smart contract proxy 215 identifies a new blocked command from the same user who started the pending consensus process, at 330 the smart contract proxy 215 creates a transaction to append a new block to that user's child ledger. The new block can include the suggested changes to the source tree, the snapshot of the master commit history, and the proposed command. Subsequent blocked commands from the same user are appended as sequential blocks to the same child ledger. However, subsequent normal (non-blocked) commands from other users are passed to the source control system 210 for processing.

If, at 335, the smart contract proxy 215 identifies a blocked command from another user, then at 340, the smart contract proxy 215 resets the on-going consensus collection process. The smart contract proxy 215 notifies consensus participants that the master history on which the blocked command is based is changed. The smart contract proxy 215 starts a new consensus collection process. Subsequent blocked commands from other users return processing to 215, generating a new child ledger, and starting a separate consensus collection process.

If, at 345, consensus is not reached, then at 365 the blockchain master ledger notifies the smart contract proxy 215 that the change proposed by the blocked command is rejected. The smart contract proxy 215 notifies the user who issued the blocked command of its rejection. The repository on the source control system 210 is not changed because the child ledger for the user stored the proposed changes, not the source control system 210.

If, at 345, consensus is reached, the blockchain master ledger notifies the smart contract proxy 215 that the proposed change is approved. As a result, at 350 the smart contract proxy 215 merges the user's child ledger into the master ledger. This maintains the immutable history of changes on the source control system 210. Finally, at 355 the smart contract proxy 215 notifies the source control system 210 to execute the blocked command, which merges the change into the history of the source control system 210. If there are multiple on-going consensus collection processes, the approval of one process triggers a merge on the source control system 210. The smart contract proxy 215 resets any other on-going consensus collection processes. However, the rejection of one consensus collection process does not reset other on-going consensus collection processes.

Figure 4:
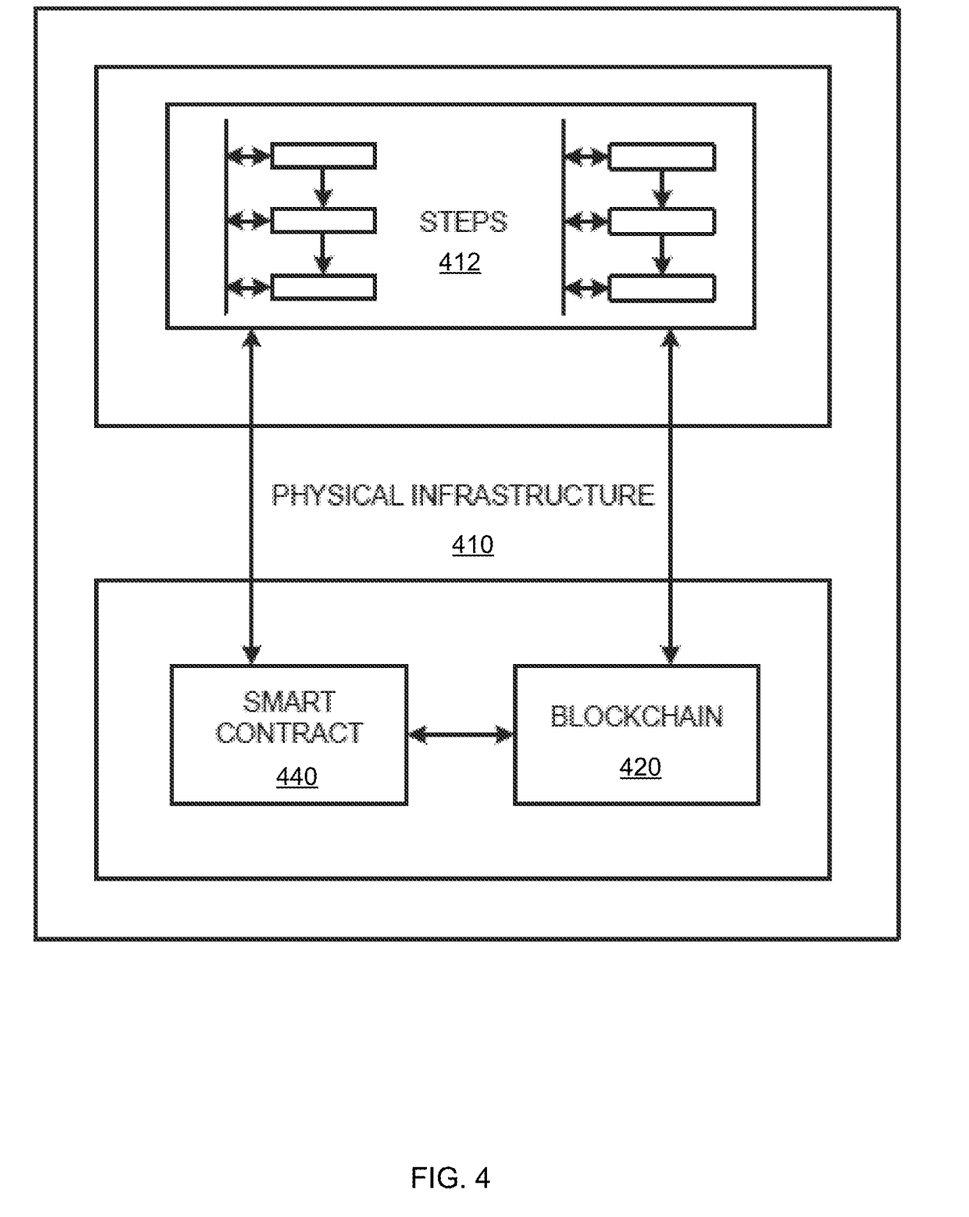
FIG. 4 illustrates an example physical infrastructure configured to perform various operations on the blockchain in accordance with one or more operations described herein, according to example embodiments.

FIG. 4 illustrates an example physical infrastructure configured to perform various operations on the blockchain in accordance with one or more of the example methods of operation according to example embodiments. The example configuration includes a physical infrastructure 410 with a blockchain 420 and a smart contract 440, which may execute any of the operational steps 412 included in any of the example embodiments. The steps/operations 412 may include one or more of the steps described or depicted in one or more flow diagrams and/or logic diagrams. The steps may represent output or written information that is written or read from one or more smart contracts 440 and/or blockchains 420 that reside on the physical infrastructure 410 of a computer system configuration. The data can be output from an executed smart contract 440 and/or blockchain 420. The physical infrastructure 410 may include one or more computers, servers, processors, memories, and/or wireless communication devices.

Figure 5:
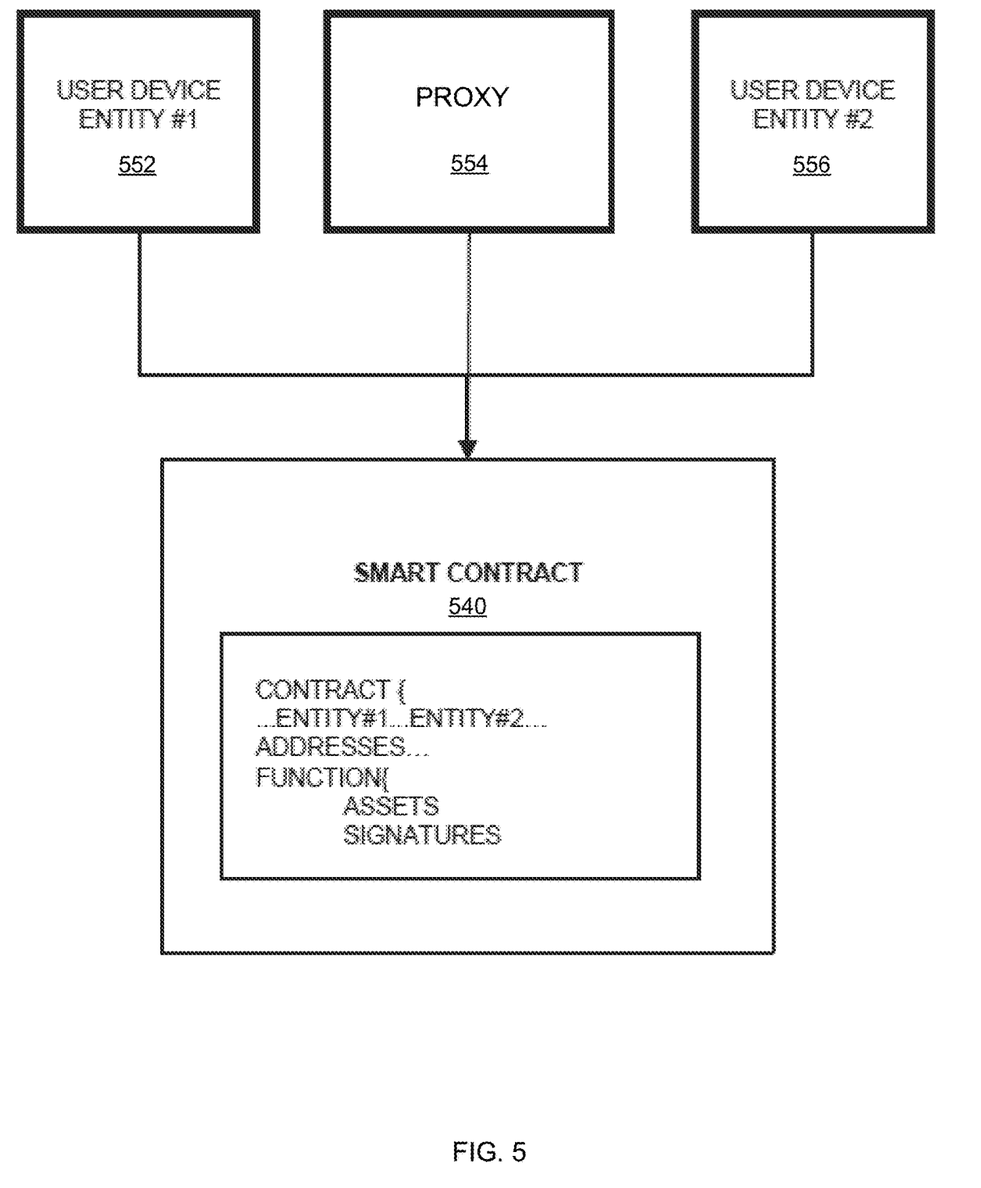
FIG. 5 illustrates an example smart contract configuration among contracting parties and a mediating server configured to enforce smart contract terms on a blockchain, according to example embodiments.

FIG. 5 illustrates an example smart contract configuration among contracting parties and a proxy configured to enforce the smart contract terms on the blockchain according to example embodiments. The configuration may represent a communication session, an asset transfer session or a process or procedure that is driven by a smart contract 540 which explicitly identifies one or more user devices 552 and/or 556. The execution, operations and results of the smart contract execution may be managed by a proxy 554. The smart contract 540 may require consensus by one or more of the entities 552 and 556 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
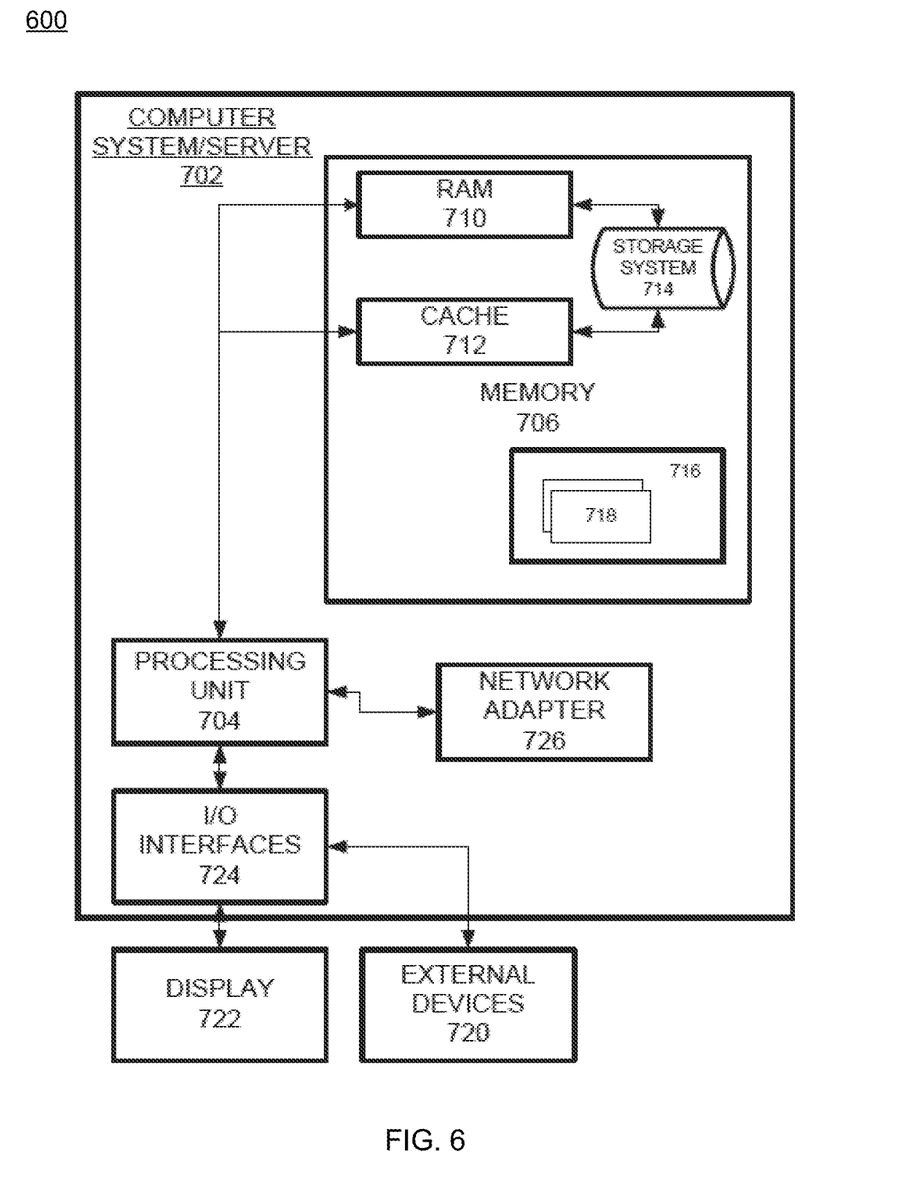
FIG. 6 illustrates an example computer system configured to support one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 702, which is operational with numerous other computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 702 in cloud computing node 600 is shown in the form of a computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    seeking consensus among users of a source tree to approve execution of a blocked command to a source control system, wherein the blocked command is a destructive command that bypasses safeguards in the source control system and forces an unconditional rewritten change history such that source code files are removed;
    creating a plurality of child ledgers, one for a user issuing the blocked command, and one for each user connected to the source control system, and initiating a blockchain transaction to link the child ledger to a master ledger;
    merging the child ledger into the master ledger when consensus is reached; and
    executing the blocked command in response to reaching consensus to execute the blocked command, wherein the consensus is a safeguard against execution of the destructive command.

2. The method of claim 1, wherein the blocked command is a command that unconditionally overwrites the source tree in the source control system with local work of the user, and wherein a list of commands that are defined as blocked commands is configured in a proxy.

3. The method of claim 1, wherein a proxy is interposed between the users of the source tree and the source control system, wherein the proxy intercepts the blocked command and initiates the blockchain transaction seeking consensus, and wherein a smart contract is embodied on the proxy.

4. The method of claim 1, wherein the child ledger comprises:
    a copy of the master ledger;
    a snapshot of commit history from the source control system;
    proposed changes to the source tree; and
    the blocked command.

5. The method of claim 1, wherein a number of users required to reply to a request for consensus is a configured rule in a smart contract.

6. The method of claim 1, further comprising:
    based on a pending consensus collection process, receiving a new blocked command from a same user; and
    appending a new sequential block to the child ledger.

7. The method of claim 1, further comprising:
    based on a pending consensus collection process, receiving the blocked command from an other user;
    resetting the pending consensus collection process, wherein the resetting includes notifying the users that a commit history on which the pending consensus collection is based is changed; and
    starting a new consensus collection process.

8. A computer system, comprising:
    a hardware server configured to:
    seek consensus among users of a source tree to approve execution of a blocked command to a source control system, wherein the blocked command is a destructive command that bypasses safeguards in the source control system and forces an unconditional rewritten change history such that source code files are removed;
    create a plurality of child ledgers, one for a user issuing the blocked command, and one for each user connected to the source control system, and initiating a blockchain child ledger for a user issuing the blocked command and initiate a blockchain transaction to link the child ledger to a master ledger;
    merge the child ledger into the master ledger when consensus is reached; and
    execute the blocked command in response to reaching consensus to execute the blocked command, wherein the consensus is a safeguard against execution of the destructive command.

9. The computer system of claim 8, wherein the blocked command is a command that unconditionally overwrites the source tree in the source control system with local work of the user, and wherein a list of commands that are defined as blocked commands is configured in a proxy.

10. The computer system of claim 8, wherein a proxy is interposed between the users of the source tree and the source control system, wherein the proxy intercepts the blocked command and initiates the blockchain transaction seeking consensus, and wherein a smart contract is embodied on the proxy.

11. The computer system of claim 8, wherein the child ledger comprises:
    a copy of the master ledger;
    a snapshot of commit history from the source control system;
    proposed changes to the source tree; and
    the blocked command.

12. The computer system of claim 8, wherein a number of users required to reply to a request for consensus is a configured rule in a smart contract.

13. The computer system of claim 8, further comprising:
    based on a pending consensus collection process, receive a new blocked command from a same user; and
    append a new sequential block to the child ledger.

14. The computer system of claim 8, further comprising:
    based on a pending consensus collection process, receive the blocked command from an other user;
    reset the pending consensus collection process, wherein the reset includes notifying the users that a commit history on which the pending consensus collection is based is changed; and
    start a new consensus collection process.

15. A non-transitory computer readable medium comprising instructions, that when read by a processor, cause the processor to perform:
    seek consensus among users of a source tree to approve execution of a blocked command to a source control system, wherein the blocked command is a destructive command that bypasses safeguards in the source control system and forces an unconditional rewritten change history such that source code files are removed;
    create a plurality of child ledgers, one for a user issuing the blocked command, and one for each user connected to the source control system, and initiating a blockchain child ledger for a user issuing the blocked command and initiate a blockchain transaction to link the child ledger to a master ledger;
    merge the child ledger into the master ledger when consensus is reached; and
    execute the blocked command in response to reaching consensus to execute the blocked command, wherein the consensus is a safeguard against execution of the destructive command.

16. The non-transitory computer readable medium of claim 15, wherein the blocked command is a command that unconditionally overwrites the source tree in the source control system with local work of the user, and wherein a list of commands that are defined as blocked commands is configured in a proxy.

17. The non-transitory computer readable medium of claim 15, wherein a proxy is interposed between the users of the source tree and the source control system, wherein the proxy intercepts the blocked command and initiates the blockchain transaction seeking consensus, and wherein a smart contract is embodied on the proxy.

18. The non-transitory computer readable medium of claim 15, wherein a number of users required to reply to a request for consensus is a configured rule in a smart contract.

19. The non-transitory computer readable medium of claim 15, further comprising:
   based on a pending consensus collection process, receive a new blocked command from a same user; and
   append a new sequential block to the child ledger.

20. The non-transitory computer readable medium of claim 15, further comprising:
   based on a pending consensus collection process, receive the blocked command from an other user;
   reset the pending consensus collection process, wherein the reset includes notifying the users that a commit history on which the pending consensus collection is based is changed; and
   start a new consensus collection process.

* * * * *